United States Patent [19]

Usui

[11] Patent Number: 5,163,602

[45] Date of Patent: Nov. 17, 1992

[54] MULTI-WALLED STEEL PIPE, A METHOD OF MAKING THE SAME AND A METAL STRIP FOR USE IN MAKING THE SAME

[75] Inventor: Masayoshi Usui, Numazu, Japan

[73] Assignee: Usui Kokusai Sangyo Kaisha-Ltd., Japan

[21] Appl. No.: 650,447

[22] Filed: Feb. 4, 1991

[30] Foreign Application Priority Data

Feb. 3, 1990 [JP] Japan .................................. 2-24846

[51] Int. Cl.⁵ ........................ B23K 1/20; B23K 101/06
[52] U.S. Cl. ................................ 228/143; 228/173.3; 228/203; 228/205
[58] Field of Search ............ 228/143, 205, 204, 173.3, 228/203; 204/34

[56] References Cited

U.S. PATENT DOCUMENTS

| | | | |
|---|---|---|---|
| 1,895,133 | 1/1933 | Quarnstrom | 228/173.3 |
| 2,092,018 | 9/1937 | Quarnstrom | 228/143 |
| 2,866,480 | 12/1958 | Snively | 228/143 |
| 3,805,373 | 4/1974 | Savolainen | 228/173.3 |

Primary Examiner—Kenneth J. Ramsey

[57] ABSTRACT

A multi-walled steel pipe comprises a metal strip plated with copper and including a brazing layer thereon. At least one surface of the metal strip is roughened and braze welded to the other, overlapping surface when the metal strip is rolled. The roughened surface has a roughness in the range of between 10 and 30μm. A method of making a multi-walled steel pipe comprises roughening at least one surface of a metal strip, the metal strip being previously plated with copper and including a brazing layer thereon, rolling the metal strip a plurality of times by a pipe forming machine to provide a pipe body with the roughened surface directed toward the other overlapping surface, while the metal strip being fed between a plurality of sets of rollers in the pipe forming machine, and heating the pipe body to a melting temperature of the brazing layer in a furnace so as to braze weld the overlapping surfaces of the metal strip together.

6 Claims, 1 Drawing Sheet

MULTI-WALLED STEEL PIPE, A METHOD OF MAKING THE SAME AND A METAL STRIP FOR USE IN MAKING THE SAME

BACKGROUND OF THE INVENTION

1. Field of the Invention

The present invention relates to a multi-walled steel pipe designed for use, generally, in an automotive vehicle, electric refrigerator or other machines and apparatus to feed oil and gas, as well as to a method of making a multi-walled steel pipe and a metal strip for use in making a multi-walled steel pipe. Such a multi-walled steel pipe has a small diameter, for example, of less than 15 m/m and requires sufficient pressure resistance and mechanical strength.

2. Description of the Prior Art

FIG. 4 shows an exemplary prior art steel pipe. Surfaces 11' of a metal strip are plated with copper to provide smooth surfaces 13 with a brazing layer of a few microns thereon. The metal strip is then rolled in its width direction to provide a multi-walled steel pipe. The smooth surfaces 13 or overlapping surfaces 12 are braze welded together as at 14.

However, the overlapping peripheral surfaces 12 are flat-rolled smooth surfaces 13, and no means is provided to hold the surfaces after the metal strip has been rolled in its width direction. Such a conventional pipe is thus subject to spring back. In addition, when the pipe is heated to a melting temperature of the brazing filler metal in a furnace so as to effect braze welding 14, the filler metal is not equally distributed between the overlapping surfaces 12 of the small diameter pipe. This results in undesirable development of defects or pinholes and deteriorates pressure resistance and mechanical strength of the pipe. The prior art pipe is, thus, subject to cracking and breakage. An increased yield of pipes are also not expected with a conventional production method.

SUMMARY OF THE INVENTION

It is an object of the present invention to overcome the problems encountered in the prior art and to provide a multi-walled steel pipe, a method of making a multi-walled steel pipe, and a metal strip for use in making a multi-walled steel pipe, which allow equal distribution of a brazing filler metal between contact or overlapping surfaces of the steel pipe and promotes capillary attraction to minimize undesirable development of pinholes so as to safely braze weld the overlapping surfaces of the steel pipe.

In order to achieve the foregoing object, a first embodiment of the present invention provides a multi-walled steel pipe comprising a metal strip plated with copper and including a brazing layer, at least one surface of which being roughened and braze welded to the other or overlapping surface when the metal strip is rolled a plurality of times. A second embodiment provides a multi-walled steel pipe including a metal strip plated with copper and including a brazing layer, the steel pipe being rolled a plurality of times in such a manner that overlapping surfaces are braze welded together, wherein one of the overlapping surfaces is different in roughness from the other. A third embodiment provides a method of making a multi-walled steel pipe, which comprises roughening at least one surface of a metal strip, the metal strip being plated with copper to provide a brazing layer thereon, and rolling the metal strip a plurality of times to form a pipe body by a pipe forming machine while the metal strip is being fed between a plurality of sets of rollers in the pipe forming machine with the roughened surface directed toward an overlapping surface, and heating the pipe body to a melting temperature of the brazing filler metal or layer in a furnace to braze weld the overlapping surfaces together, the furnace including a neutral or reducing atmosphere gas. A fourth embodiment provides a method of making a multi-walled steel pipe, which comprises roughening at least one surface of a metal strip and rolling the metal strip a plurality of times in its width direction to form a pipe body, while the metal strip is being fed between a plurality of sets of rolls in a pipe forming machine, the metal strip being plated with copper to provide a brazing layer thereon, and at least one of each set of rollers being roughened, and heating the pipe body to a melting temperature of the brazing layer in a furnace to braze weld overlapping surfaces together, the furnace including a neutral or reducing atmosphere gas. A fifth embodiment provides a method of making a multi-walled steel pipe which comprises roughening one surface of a metal strip and plating the one surface with copper to provide a brazing layer thereon, rolling the metal strip a plurality of times in its width direction to form a pipe body by a pipe making machine while the metal strip is being fed between a plurality of sets of rollers in the machine in such a manner that the one surface of the metal strip is directed toward the other, overlapping surface, and heating the pipe body to a melting temperature of the brazing layer in a furnace to braze weld the overlapping surfaces together, the furnace including a neutral or reducing atmosphere gas. A sixth embodiment provides a metal strip having one roughened surface plated with copper to provide a brazing layer thereon. Also, the roughened surface has a roughness in the range of between 10 and 30 $\mu$m.

The structures and methods of the present invention allow equal distribution of the brazing filler metal between the overlapping surfaces under the influence of the roughened surface during a braze welding process. Since the overlapping surfaces are different in roughness from one another, they are engaged with each other to prevent spring back. This promotes capillary attraction to minimize undesirable development of pinholes, substantially equally and safely braze welds the overlapping surfaces of the pipe, and improves pressure resistance and mechanical strength regarding cracking and breakage of the multi-walled steel pipe. This invention thus provides an increased yield of high quality steel pipe.

BRIEF DESCRIPTION OF THE DRAWINGS

A better understanding of the present invention may be had by reference to the following description of preferred embodiments when taken in conjunction with the accompanying drawings, in which.

DETAILED DESCRIPTION OF THE INVENTION

Figure 1:
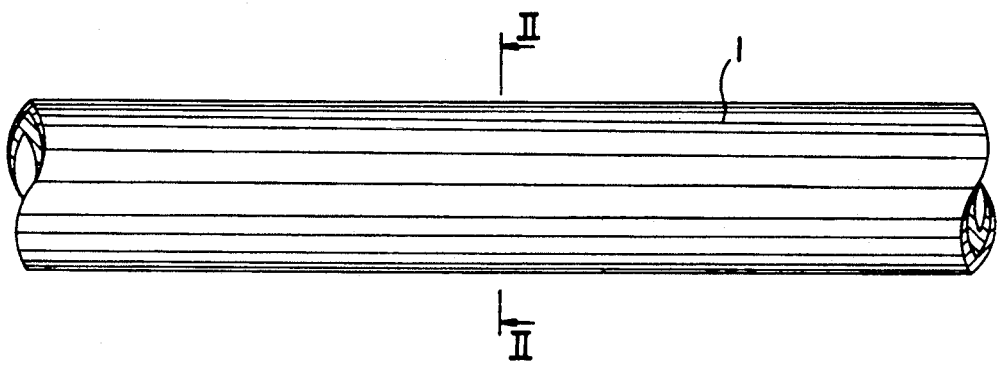
FIG. 1 is a plan view of a multi-walled steel pipe fabricated according to one embodiment of the present invention.
Figure 3:
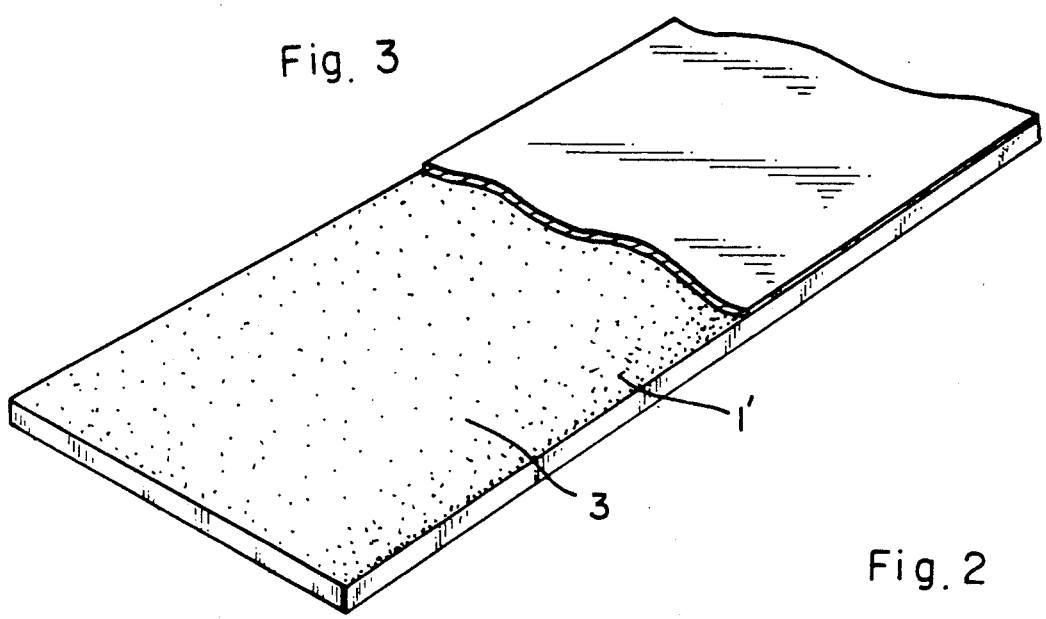
FIG. 3 is a perspective view, partly broken away, of a metal strip for use in the present invention.
Figure 2:
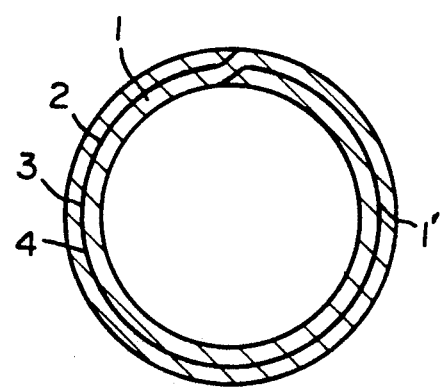
FIG. 2 is an enlarged sectional view taken along the line of II—II of FIG. 1.
Figure 4:
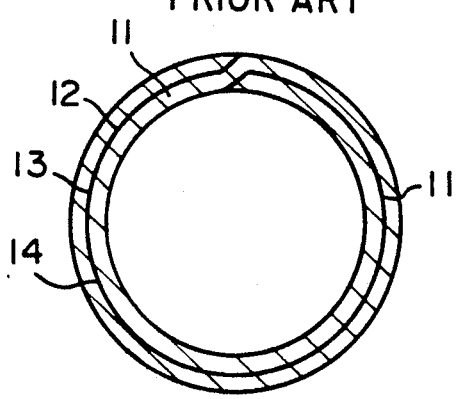
FIG. 4 is a transverse sectional view, on an enlarged scale, of a conventional steel pipe.

With reference to FIGS. 1 to 3, the reference numeral 1 designates a multi-walled steel tube or pipe having a very small diameter, for example, of less than 15 m/m. A metal strip has at least one surface 1' plated with copper to include a brazing layer thereon. The brazing layer has a thickness of several microns. The surface 1' of the metal strip is roughened by blasting, etching, or brushing, or by means of a roller and has a roughness in the range of between 10 and 30 $\mu$m to provide a roughened surface 3. A pipe forming machine includes a plurality of sets of rollers. The metal strip is, thereafter, fed between the sets of rollers, so that it is rolled a plurality of times in its width direction to provide a pipe body with the roughened surface 3 directed toward an overlapping surface 2. The pipe body is introduced into a furnace and heated to a melting temperature of the brazing filler metal or layer, preferably 1100° to 1150° C. This causes the overlapping surfaces to be braze welded together as at 4. The furnace includes a neutral or reducing atmosphere gas.

Experiments have shown that if the roughness of the roughened surface is less than 10 $\mu$m, the wettability of the brazing filler metal deteriorates. On the other hand, if the roughness of the roughened surface is greater than 30 $\mu$m, incomplete brazed joint (i.e. pinhole) is likely to be produced. It is for this reason that the roughened surface has such a roughness as indicated earlier. The steel pipe may have a roughened inner or outer peripheral surface. This not only prevents "drop" of the brazing filler metal, but also facilitates attachment or electroplating of tin, lead, zinc or their alloys to the inner or outer peripheral surface of the steep pipe where corrosion and erosion may occur.

EXAMPLE

A metal strip, made from SPCC and having a thickness of 0.35 m/m, is used to form a dual-walled steel pipe. The steel pipe has an outer diameter of 10 m/m and a thickness of 0.7 m/m. A plurality of test steel pipes are prepared. The test pipes are all plated with copper, each having a brazing layer of 2 $\mu$m, but have different roughness. The test pipes are heated at a furnace. A microscope is used to check pinholes in each test pipe. Table 1 shows test results.

The present invention is not limited to the foregoing embodiment. For example, at least one, preferably, the first roller, of each set of rollers in a pipe forming machine may be roughened to roughen at least one surface of the metal strip simultaneously when the metal strip plated with copper is fed between the sets of rollers. As shown in FIG. 3, the metal strip may be plated with copper to provide a brazing layer after the surface 1' of the metal strip has been roughened. The metal strip is then rolled with the surface 1' in contact with one another. The metal strip is thereafter heat treated as in the previous embodiment.

To compare with the present invention, another dual-walled test pipe is prepared. All the surface of this test pipe is made from the same material and heat treated under the same conditions. All the surfaces of the test pipe are smooth and not roughened. As a result of tests, pinholes are developed all over the pipe.

As discussed above, in the present invention, one side or surface 1' of the metal strip is roughened as at 3, or one of the sides is different in roughness from the other. The two sides are braze welded together as at 4. This arrangement allows equal distribution of a brazing filler metal between overlapping peripheral surfaces of the metal strip during a braze welding process. The two sides of the metal strip are engaged with one another to prevent spring back since they are different in roughness from one another. In addition, capillary attraction serves to substantially equally distribute the brazing filler metal in the joint to minimize undesirable development of pinholes. This safely braze welds the overlapping peripheral surfaces 2 together and improves pressure resistance and mechanical strength of the multi-walled steel pipe. Cracking and breakage of the steel pipe are unlikely to occur. The methods of the present invention are useful and provide an increased yield of high quality pipes.

It will be appreciated that many other variations and modifications may be made in the structures and methods described herein without departing from the scope of the invention. Accordingly, the present invention is to be limited only in accordance with the appended claims.

TABLE 1

| Size of pinhole | Rate of development of pinholes (%) Roughness | | | | | | |
| --- | --- | --- | --- | --- | --- | --- | --- |
| | 5 $\mu$m | 10 $\mu$m | 15 $\mu$m | 20 $\mu$m | 25 $\mu$m | 30 $\mu$m | 35 $\mu$m |
| No pinhole | 2 | 20 | 33 | 35 | 30 | 19 | 3 |
| Pinhole having size less than 5% of entire pipe circumference | 5 | 28 | 35 | 36 | 35 | 27 | 10 |
| Pinhole having size less than 10% of entire pipe circumference | 25 | 40 | 31 | 27 | 22 | 36 | 24 |
| Pinhole having size less than 15% of entire pipe circumference | 45 | 10 | 1 | 2 | 12 | 16 | 36 |
| Pinhole having size less than 20% of entire pipe circumference | 20 | 2 | | | 1 | 2 | 23 |
| Pinhole having size less than 25% of entire pipe circumference | 2 | | | | | | 3 |
| Pinhole having size less than 30% of entire pipe circumference | 1 | | | | | | 1 |

What is claimed is:

1. A method of making a multi-steel pipe, comprising the steps of:
   providing a steel strip having opposed surfaces;
   plating at least one said surface with copper to define a brazing layer thereon;
   roughening all of at least the surface of said metal strip previously plated with copper to define a roughness in the range of 10-30 μm and such that the opposed surfaces have different respective roughness;
   rolling said metal strip a plurality of times in its width direction by a pipe forming machine so as to provide a multi-walled pipe body with said copper plated roughened surface directed toward the opposed surface, while said metal strip is being fed between a plurality of sets of rollers in said pipe forming machine; and
   heating said pipe body to a melting temperature of said brazing layer in a furnace so as to braze weld said overlapping surfaces of said metal strip together, said furnace including a neutral or reducing atmosphere gas.

2. The method of claim 1, wherein said at least one surface is roughened by blasting, etching or brushing, or by means of a roller and has a roughness in the range of between 10 and 20 μm.

3. A method of making a multi-walled steel pipe, comprising the steps of:
   providing a steel strip having opposed surfaces;
   plating at least one said surface with copper to define a brazing layer thereon;
   roughening all of at least the surface of said metal strip previously plated with copper by feeding said metal strip between a plurality of sets of rollers in a pipe forming machine having at least one roller with a roughened surface with which said at least one surface of said metal strip can be in contact, such that said surface of said metal strip is provided with a roughness in the range of 10-30 μm and such that simultaneously said metal strip is rolled a plurality of times in its width direction to define a multi-walled pipe body; and
   heating said pipe body to a melting temperature of said brazing layer in a furnace so as to braze weld the overlapping surfaces of said metal strip together, said furnace including a neutral or reducing atmosphere gas.

4. The method of claim 3, wherein said at least one surface is roughened by blasting, etching or brushing, or by means of a roller and has a roughness in the range of between 10 and 20 μm.

5. A method of making a multi-walled steel pipe, comprising the steps of:
   providing a steel strip having opposed surfaces;
   roughening all of at least one surface of said metal strip to define a roughness in the range of 10-30 μm and such that the opposed surfaces have different respective roughnesses;
   plating the roughened surface of the metal strip with copper to provide a brazing layer thereon;
   rolling said metal strip a plurality of times in its width direction by a pipe forming machine so as to provide a pipe body with said roughened surface directed toward the opposed surface, while said metal strip is being fed between a plurality of sets of rollers in said pipe forming machine; and
   heating said pipe body to a melting temperature of said brazing layer in a furnace so as to braze weld said overlapping surfaces together, said furnace including a neutral or reducing atmosphere gas therein.

6. The method of claim 5, wherein said one surface of said metal strip is roughened by blasting, etching or brushing, or by means of a roller and has a roughness in the range of between 10 and 20 μm.

* * * * *